(No Model.)

J. F. MERTZ & B. LORTON.
HARVESTER WHEEL.

No. 312,883. Patented Feb. 24, 1885.

WITNESSES
Ed. A. Newman,
Al. C. Newman,

INVENTORS
John F. Mertz.
Britton Lorton.
By their Attorney
J. H. Hall

United States Patent Office.

JOHN F. MERTZ AND BRITTON LORTON, OF UNIOPOLIS, OHIO; SAID MERTZ ASSIGNOR TO SAID LORTON; SAID LORTON ASSIGNOR OF ONE-HALF TO NATHAN STOUT, OF SIDNEY, OHIO.

HARVESTER-WHEEL.

SPECIFICATION forming part of Letters Patent No. 312,883, dated February 24, 1885.

Application filed October 21, 1884. (No model.)

*To all whom it may concern:*

Be it known that we, JOHN F. MERTZ and BRITTON LORTON, citizens of the United States, residing at Uniopolis, in the county of Auglaize and State of Ohio, have invented a new and useful Improvement in Harvesters, of which the following is a specification.

Our invention relates to harvesters or like machines; and the novelty consists in the construction, arrangement, and adaptation of the traction or carrying wheels thereof, as will be more fully hereinafter set forth and specifically pointed out in the claim.

Machines of this class are employed upon soft ground, and the wheels frequently become clogged by the soil adhering to them. This is not only troublesome and adds weight to the machine, but the dirt is liable to get into the grain and also into the gearing. We provide a strong, light, and durable wheel for this purpose, one which presents a smooth surface to the soil, both upon the sides and periphery.

The invention contemplates an ordinary hub and spokes, which are properly journaled upon a spindle in the main frame of the machine. This portion—namely, the hub and spokes—may be cast in one piece, and of metal, or may be made separate and secured together. The periphery or rim may be sustained in any desirable manner; but the external periphery forms a close joint with inclosing sides, which embrace the wheel except at the central portion nearest the hub. The side plates are secured to the spokes in any suitable way, as by screws or bolts, and preferably are made of sheet metal. The operating-gear is secured to the wheel in any known and approved manner, but forms no part of our invention. Adjustable scrapers are secured to the main frame, and these scrapers correspond with the external contour of the wheel, which is preferably flaring from the periphery inward.

The invention is illustrated in the accompanying drawings, which form a part of this specification, and in which—

Figure 1:
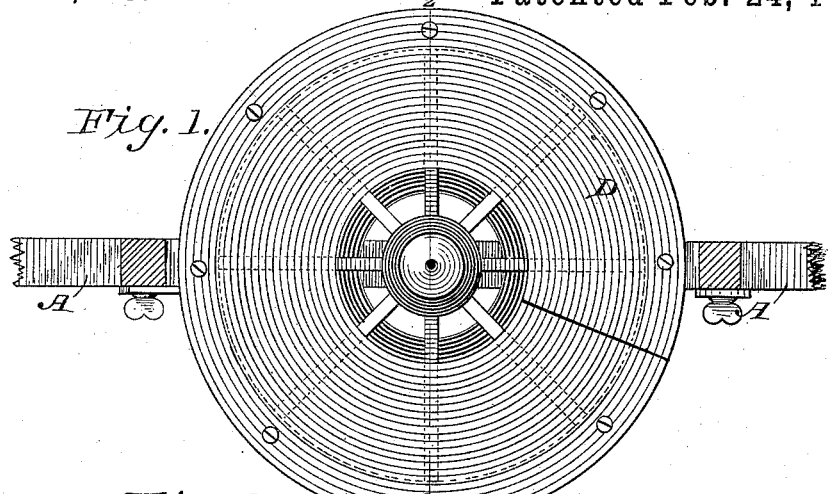
Figure 3:
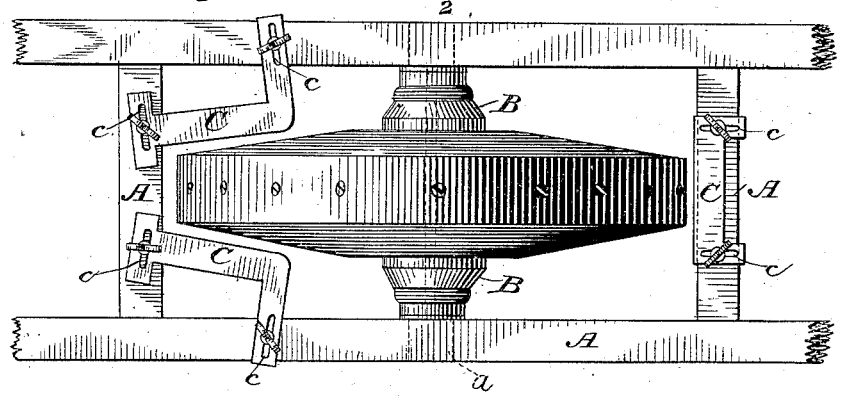
Figure 2:
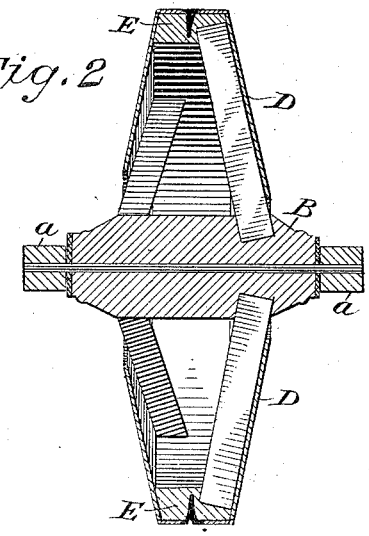

Figure 1 is a side elevation of the wheel, with its supporting-frame shown in section. Fig. 2 is a vertical cross-section of the wheel and its frame, and Fig. 3 is a bottom plan view showing the adjustable sweeps or scrapers.

Referring to the drawings, A designates the main frame of the machine, in which is journaled, at $a$, the spider or frame B of a traction-wheel.

Secured to the under face of the frame are sweeps or scrapers C, having slots $c$, by which said scrapers are adapted to be adjusted in relation to the peculiar wheel which is to be described, and which forms the essential feature of this invention. One of these scrapers is preferably arranged upon either side of the wheel, so as to act upon the inclined sides thereof, and an additional scraper is similarly adapted to operate upon the tread.

D designates side plates of sheet metal, which are secured to the spokes or arms of the spider, or to the periphery E, with which it forms a tight joint. The periphery is of any approved material and construction, and has a broad tread. The spokes of the spider incline inward toward the periphery alternately, so that the side plates, D, are secured in inclined positions, each upon alternate spokes. These inclined positions successfully resist the gravity of the machine upon the soft soil. The central portion of the side plates, D, are cut away for a proper distance around the hub, and are inclined inward from center to circumference, substantially in the manner shown.

This wheel is light, strong, and is peculiarly adapted to ride lightly upon soft soil, and also to avoid niches, recesses, and spaces in which the soil would collect, the exterior being absolutely smooth upon all surfaces with which the soil ordinarily comes in contact.

We deem the inclined sides having their bearings upon alternate inclined spokes of the spider, in their relation to the peculiar scrapers shown, important.

What we claim as new is—

The combination, with the frame A of a harvester or the like, and with the spider B, having alternate spokes inclined in opposite directions, as shown, of the side plates, D, secured upon said spokes and inclined to resist gravity, the wide periphery E, and the scrapers C, arranged adjustably upon the frame A, and adapted to serve with the sides and tread of the wheel, as set forth.

This specification signed and witnessed this 16th day of October, 1884.

JOHN F. MERTZ.
BRITTON LORTON.

Witnesses:
GEORGE BURGOON,
J. V. BOOP.